S. T. Hutchins,
Cattle Tie.

No. 112,922.                    Patented Mar. 21, 1871.

Witnesses.
Cha. Kenyon,
Villetto Anderson

Inventor.
S. T. Hutchins,
Chipman Hosmer & Co.
Attorneys.

United States Patent Office.

SETH T. HUTCHINS, OF NORTH ANSON, MAINE.

Letters Patent No. 112,922, dated March 21, 1871.

IMPROVEMENT IN CATTLE-TIES.

The Schedule referred to in these Letters Patent and making part of the same.

*To all whom it may concern:*

Be it known that I, SETH T. HUTCHINS, of North Anson, in the county of Somerset and State of Maine, have invented a new and valuable Improvement in "Cattle-Ties;" and I do hereby declare that the following is a full, clear, and exact description of the construction and operation of the same, reference being had to the annexed drawing making a part of this specification, and to the letters and figures of reference marked thereon.

Figure 1:
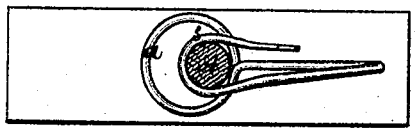

Figure 1 of the drawing is a representation of a horizontal section of my invention through the line $x\ x$.

Figure 2:
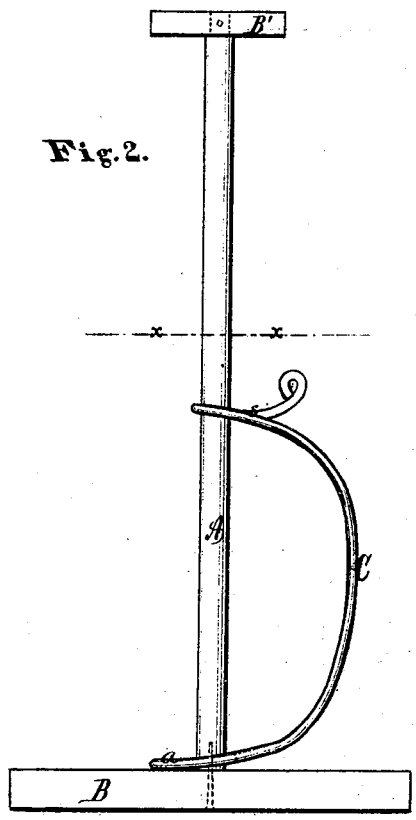

Figure 2 is a front view of the same.

The nature of my invention consists in the construction of a metal tie for cattle and other animals, as will be hereafter fully set forth.

In order to enable others skilled in the art to which my invention appertains to make and use the same, I will now proceed to describe its construction and operation, referring to the annexed drawing.

A represents a post or stanchion, secured at the bottom and top to cross-pieces B and B'.

C represents the animal tie, consisting of one piece of round steel, or any other suitable spring metal.

This tie should be of sufficient length to extend the entire width of one side of the neck of the animal, and to continue around the stanchion A at each end, as shown on the drawing in fig. 2

The lower part of this tie is bent into the shape of a ring, marked $a$ on the drawing, which is placed or secured around the stanchion to which the animal is to be fastened or hitched.

The upper part of this tie is bent laterally in the form of a spring hook, as shown on the drawing at $s$.

The end of this hook is bent inward or toward the main rod at $s$, and the stanchion is made of sufficient diameter to spring the sides of the hook apart, as it is pressed thereon. Yet when this strait is passed, the bend of the hook is sufficiently expanded to allow it to play freely around the stanchion.

The neck of the animal is placed in the bail, and the neck being yielding will allow the hook $s$ of the tie C to be sprung around the stanchion, after which it will be impossible for them to unhook.

The end of the hook is bent upward, so that it cannot injure the animal in any manner.

It is plain that animals fastened in this position, and by such a device as I have above described, cannot shift or move their heads to the other side of the post or stanchion to which they are hitched, and that therefore there will be no danger of choking, &c.

Having thus fully described my invention—

What I claim as new, and desire to secure by Letters Patent, is—

The cattle-tie C, provided with ring $a$ and spring hook $s$, in combination with the stanchion A, substantially as and for the purpose specified.

In testimony that I claim the above I have hereunto subscribed my name in the presence of two witnesses.

SETH T. HUTCHINS.

Witnesses:
  EUGENE F. COLLINS,
  MARCELLUS STEWARD.